L. R. BARKER & E. C. DIETRICH.
TROLLEY MECHANISM.
APPLICATION FILED AUG. 19, 1912.
1,050,908.
Patented Jan. 21, 1913.
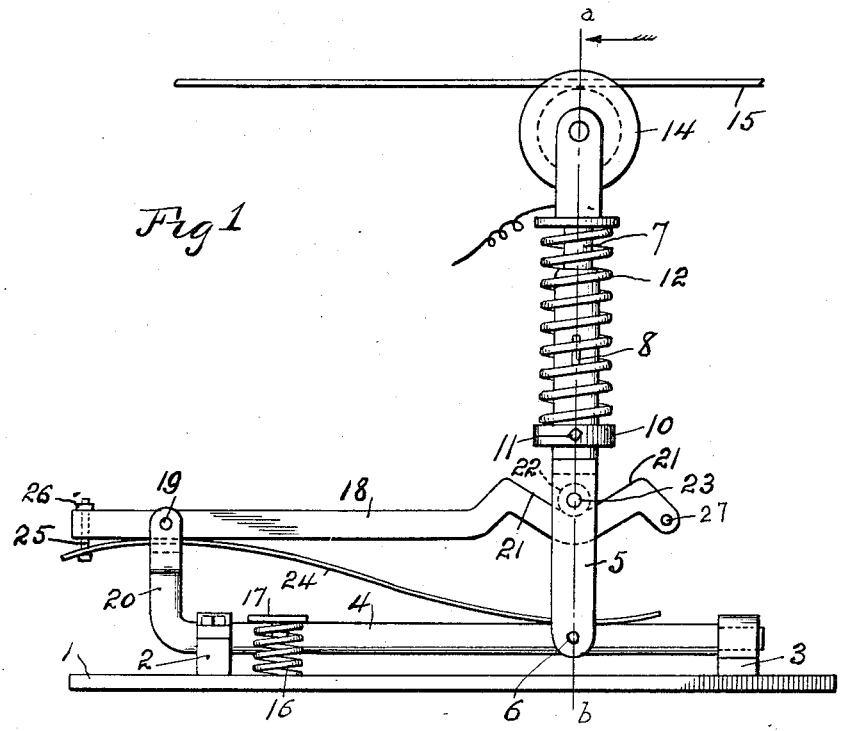
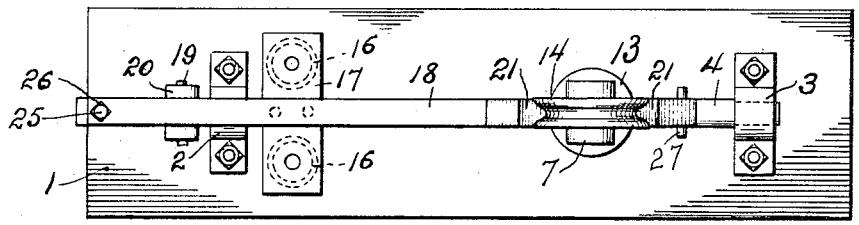
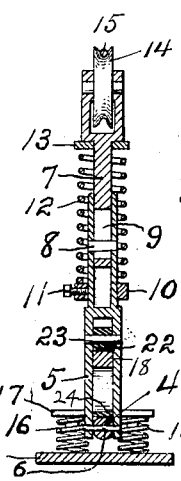
WITNESSES:
R. E. Hamilton
E. B. House
INVENTORS
Lewis R. Barker
Edward O. Dietrich
BY Warren D. House
Their ATTORNEY.

UNITED STATES PATENT OFFICE.

LEWIS R. BARKER AND EDWARD C. DIETRICH, OF RIVERTON, KANSAS, ASSIGNORS OF ONE-THIRD TO SAMUEL E. GARD, OF RIVERTON, KANSAS.

TROLLEY MECHANISM.

1,050,908.

Specification of Letters Patent. Patented Jan. 21, 1913.

Application filed August 19, 1912. Serial No. 715,747.

*To all whom it may concern:*

Be it known that we, LEWIS R. BARKER and EDWARD C. DIETRICH, citizens of the United States, residing at Riverton, in the county of Cherokee and State of Kansas, have invented a certain new and useful Improvement in Trolley Mechanism, of which the following is a specification.

Our invention relates to improvements in trolley mechanisms.

The object of our invention is to provide a novel trolley mechanism which is adapted for use on traveling cranes or other machines which, in operation, are so close to the trolley wire as to require a short trolley pole.

Our invention provides a trolley mechanism having a trolley pole which is adapted to travel in either direction on the trolley wire and which upon encountering an obstruction may swing forwardly or backwardly, means being provided for permitting lateral movement of the trolley pole and for normally forcing the trolley pole to assume a substantially vertical position.

Our invention provides further a novel trolley pole which is automatically extensible so as to permit the pole to be in a vertical position and always have contact with the trolley wire irrespective of changes of distance between the trolley wire and the trolley pole support.

In the accompanying drawings which illustrate our invention in its preferred form, Figure 1 is a side elevation of the mechanism, showing the trolley wheel engaged with the trolley wire. Fig. 2 is a plan view of the trolley mechanism. Fig. 3 is a vertical section on the line *a—b* of Fig. 1.

Similar characters of reference designate similar parts in the different views.

1 designates a supporting base, preferably of wood, slate or other insulating material, upon which are mounted two bearings 2 and 3 in which is pivoted a horizontal rock bar 4 which serves as a support for the trolley pole.

Preferably the trolley pole is longitudinally extensible and comprises the following described parts:—The lower member 5 is preferably bifurcated at its lower end, the arms thereof being pivoted by a transverse horizontal pin 6 to the rock bar 4. The upper member 7 is provided with a vertical cylindrical lower end longitudinally slidably fitted in the tubular upper end of the lower member 5, the last named member having in the tubular portion two oppositely disposed vertical slots in which is secured a key 8 which extends through a vertical slot 9 provided in the member 7, the key serving to limit the outward or upward movement of the member 7. Longitudinally adjustable on the tubular part of the member 5 is a collar 10 having a set screw 11 which secures the collar in the position to which it may be adjusted. A coil spring 12 encircles the member 5 and has its lower end resting against the collar 10, its upper end having a bearing against a collar 13, which encircles the shank of the member 7 and bears against the enlarged bifurcated end of the member 7. Between the arms of the bifurcated upper end of the member 7 is pivoted in the usual manner an ordinary trolley wheel 14 adapted to run against a trolley wire 15.

For normally forcing the trolley pole to a vertical position relative to the vertical plane of the wire 15, two coil springs 16 are mounted on the base 1 and respectively bear against the under side of a plate 17 which is secured to the rock bar 4, the springs being disposed at opposite sides of the rock bar 4, as shown in dotted lines in Fig. 2. These springs permit the rock bar 4 to rock so as to permit the trolley pole to swing laterally in following the trolley wire 15. To normally force the trolley pole to a vertical or medial position after it has been swung forwardly or backwardly on its axis by reason of the trolley wheel striking an obstruction, we provide yielding means comprising, preferably, a normally horizontal bar or lever 18 which is pivoted by a horizontal pin 19 to the bifurcated upper end of an upwardly extending arm 20 with which one end of the bar 4 is provided. The upper side of the bar or lever 18 is provided with converging cam faces 21 adapted to bear against a roller 22 with which the trolley pole is provided and which is rotatively mounted on a horizontal pin 23 secured in the arms of the member 5, the roller being located between said arms.

A spring is mounted between the bar or lever 18 and the rock bar 4 for normally swinging the bar or lever 18 so that it will have its cam faces 21 forced upwardly against the roller 22. Preferably this spring is a flat spring 24 which bears against the bar 4 and against the underside of the bar 18 between the arm 20 and the cam faces 21. A vertical bolt 25 extends through the bar 18 at the opposite side of the arm 20 and through the spring 24, which at this point curves away from the bar 18 and rests upon the head of the bolt 25. The upper end of the bolt 25 has a nut 26 mounted thereon which bears against the upper side of the bar 18. By adjusting the nut the tension of the spring 24 may be varied, as will be readily understood.

In operating our invention the trolley pole is normally held vertically so as to run with equal facility in either direction along the trolley wire. In case an obstruction is encountered by the trolley wheel 14, the roller 22 will run along one of the cam faces 21, thereby depressing the bar 18, which, as soon as the obstruction has been passed, will force the trolley pole back to the medial position due to the pressure exerted upon the bar 18 by the spring 24.

A transverse pin 27 in the bar 18 at the right of the right cam face 21, as viewed in Fig. 1 serves to prevent the trolley pole being swung off from the bar 18 if the trolley pole is swung in that direction on its axis.

By the employment of a vertical extensible trolley pole, the mechanism is adapted for use on machines which are very close to the trolley wire, the trolley wheel may readily run in either direction on the trolley wire, and the trolley pole will not extend forwardly or backwardly beyond the machine, thereby conserving space.

We do not limit our invention to the structure shown and described, as modifications, within the scope of the appended claims, may be made without departing from the spirit of our invention.

Having thus described our invention, what we claim and desire to secure by Letters Patent, is:—

1. In a trolley mechanism, a trolley pole, a support to which the trolley pole is pivoted to swing on a horizontal axis, and yielding means including a member pivoted on a horizontal axis to said support and having two converging cam faces for engaging the trolley pole for swinging the trolley pole on its axis to a vertical position.

2. In a trolley mechanism, a trolley pole, a support having pivoted to it on a horizontal axis said trolley pole, means for pivotally supporting said support so that it may rock on an axis disposed horizontally at right angles to the axis of the trolley pole, and yielding means including a member pivoted to the support and engaging the trolley pole for normally swinging the trolley pole on its axis to a vertical position.

3. In a trolley mechanism, a laterally rocking support, a trolley pole pivoted on said support to swing forwardly and backwardly from a medial position, a member pivoted to said support and engaging said trolley pole, and means for normally forcing said member to a position in which it will yieldingly hold the trolley pole in the medial position.

4. In a trolley mechanism, a laterally rocking support, a trolley pole pivoted thereto to swing forwardly and backwardly, a member pivoted to the support and having means for engaging said trolley pole for swinging the trolley pole to a medial position, and a spring for yieldingly holding the said member engaged with the trolley pole.

5. In a trolley mechanism, a laterally rocking support, a trolley pole pivoted thereto to swing forwardly and backwardly from a medial position, means for normally forcing the support to rock to a position in which the axis of the trolley pole will be horizontal, a member pivoted to the support and having two converging cam faces for engaging the trolley pole to normally force it to the medial position, and a spring for yieldingly forcing the said member into engagement with the trolley pole.

6. In a trolley mechanism, a laterally rocking support, a trolley pole pivoted thereto so as to swing forwardly and backwardly from a medial position, spring actuated means for normally forcing the support to swing to a position in which the pivotal axis of the trolley pole will be disposed horizontally, a member pivoted to the said support and having means for engaging with and swinging the trolley pole to said medial position, and a spring for yieldingly forcing said member into engagement with the trolley pole.

7. In a trolley mechanism, a laterally rocking support, a trolley pole pivoted thereto, means for normally rocking the support to a position in which the pivotal axis of the pole will be disposed horizontally, a member pivoted to said support and having two converging cam faces for engaging the trolley pole for swinging it to a medial position, and a spring for forcing said member to a position in which the member will hold the trolley pole in the medial position.

8. In a trolley mechanism, a laterally rocking support, a trolley pole pivoted thereto, two springs disposed so as to normally rock the support to a position in which the pivotal axis of the trolley pole will be horizontal, a member pivoted to the support to swing vertically and having on one side two converging cam faces which engage the trolley pole and normally force it to a medial position, and a spring for yieldingly holding the said member engaged with the trolley pole.

In testimony whereof we have signed our names to this specification in presence of two subscribing witnesses.

LEWIS R. BARKER.
EDWARD C. DIETRICH.

Witnesses:
SAMUEL E. GARD,
FRANK E. MARSHALL.